(12) United States Patent
Hervé

(10) Patent No.: US 12,503,316 B2
(45) Date of Patent: Dec. 23, 2025

(54) SYSTEM, ASSEMBLY AND METHOD FOR SEPARATING A FLOW OF TABLETS COMPACTED BY A COMPACTING DEVICE

(71) Applicant: BONALS TECHNOLOGIES, Saint Just Saint Rambert (FR)

(72) Inventor: Palmier Hervé, Essertines en Chatelneuf (FR)

(73) Assignee: BONALS TECHNOLOGIES, Saint Just Saint Rambert (FR)

( * ) Notice: Subject to any disclaimer, the term of this patent is extended or adjusted under 35 U.S.C. 154(b) by 140 days.

(21) Appl. No.: 18/356,306

(22) Filed: Jul. 21, 2023

(65) Prior Publication Data
US 2024/0025660 A1    Jan. 25, 2024

(30) Foreign Application Priority Data
Jul. 21, 2022   (EP) .................................... 22306086

(51) Int. Cl.
 *B65G 47/08*    (2006.01)
(52) U.S. Cl.
 CPC ................................ *B65G 47/088* (2013.01)
(58) Field of Classification Search
 CPC ........ B03B 11/08; B03B 11/005; B50B 15/32
 USPC ..................................................... 198/418.7
 See application file for complete search history.

(56) References Cited

U.S. PATENT DOCUMENTS 2,788,882 A      4/1957  Swartz
5,147,027 A *    9/1992  Cruver ................. B65G 47/084
                                                     198/419.3
10,099,865 B2 *  10/2018 Hammacher ........ B65G 47/082
10,343,850 B2 *  7/2019  Rabec .................... B65G 47/52
2008/0237097 A1  10/2008 Kolbe
(Continued)

FOREIGN PATENT DOCUMENTS

DE    20200794 U1   5/2002
EP    3106397 A1   12/2016
EP    3301044 A1    4/2018

OTHER PUBLICATIONS

DE20200794 (Year: 2002).*
(Continued)

*Primary Examiner* — Gene O Crawford
*Assistant Examiner* — Lester Rushin, III
(74) *Attorney, Agent, or Firm* — Merchant & Gould P.C.

(57) ABSTRACT

A system and method separate flow of tablets compacted by a compacting device. The separating system includes an input line to recover a flow of tablets at the output of the compacting device and two output lines to eject tablets from the separating system. A device accumulates tablets positioned between the input line and the output lines and periodically accumulates a given number of tablets. The accumulating device has a line for accumulating tablets and an assembly for regulating flow of tablets, the regulating assembly including a member for retaining the tablets to accumulate the tablets in the accumulating line and a member to forcibly eject the accumulated tablets from the accumulating line. A conveying surface is under the accumulating line and accompanies displacement of the tablets toward the output lines. A routing device directs tablets from the input line toward one of the output lines.

16 Claims, 14 Drawing Sheets

(56) References Cited

U.S. PATENT DOCUMENTS

2018/0305138 A1* 10/2018 Wittmann ............ B65G 47/261

OTHER PUBLICATIONS

EP3106397 (Year: 2016).*
European Search Report received for EP Serial No. 22306086.4 on Jan. 4, 2023, 12 pgs.

* cited by examiner

SYSTEM, ASSEMBLY AND METHOD FOR SEPARATING A FLOW OF TABLETS COMPACTED BY A COMPACTING DEVICE

CROSS REFERENCE TO RELATED APPLICATION

This application claims benefit of Serial No. 22306086.4 filed Jul. 21, 2022, in Europe, and which application is incorporated herein by reference. To the extent appropriate, a claim of priority is made to the above-disclosed application.

FIELD OF THE INVENTION

This invention relates to the field of tablet design based on mixtures of components, in the form of powder or granulate in particular. It more specifically relates to a system and method for separating a flow of tablets that have been compacted by a compacting device, particularly for the purpose of post-processing these compacted tablets.

PRIOR ART

Existing devices for manufacturing tablets by compaction are conventionally rotary presses fitted with a rotary central plate in which a plurality of through dies are fashioned. On either side and opposite each of the dies are arranged lower and upper punches complementing one another, and intended to be inserted into the corresponding die to then compact the mixture it contains in order to form a tablet compacted to the desired volume. Such rotary presses make it possible to produce compacted tablets at very high rates, for example in the order of 1500 tablets per minute.

Once the tablets have been compacted, there is regularly post-processing, i.e. processing of the tablet after the compacting step. Such post-processing can for example consist in coating each compacted tablet or wrapping each compacted tablet. To do this, post-processing devices are generally used which are arranged at the output of the compacting device and allow individual or batch processing of the compacted tablets.

An existing problem of this post-processing is that the processing in question can generally not be done at the high rates used in the compacting device, but at much lower rates. Thus, the speed of the flow of compacted tablets must be reduced before they enter the post-processing device or devices.

A solution conventionally used to reduce the speed of the flow of compacted tablets and to use pacing devices, allowing the gradual reduction of the flow speed. In this regard, it is for example possible to use a succession of motor-driven conveyor belts and operating at lower and lower speeds until the desired speed for the flow of compacted tablets is reached. The drawback of such solutions is its bulk, since it is necessary to have very long conveying lengths to substantially reduce the speed of the flow of compacted tablets, in particular if one wishes to divide this speed by 3 or 4.

SUMMARY OF THE INVENTION

An aim of this invention is to make provision for a solution for reducing the speed of the flow of tablets at the output of the compacting device for the purpose of post-processing.

In particular, an aim of this invention is to make provision for a solution for reducing the speed of flow of the compacted tablets which does not require excessive bulk, and which can therefore be implemented in small production spaces.

Furthermore, an aim of this invention is to make provision for a solution for reducing the speed of flow of the compacted tablets which avoids the compacted tablets backing up in the compacting device to avoid a compaction blockage.

For this purpose, provision is made for a system for separating a flow of tablets compacted by a compacting device, wherein the separating system comprises:
  an input line configured to recover a flow of tablets at the output of the compacting device;
  two output lines intended to eject tablets from the separating system;
  a device for accumulating tablets positioned between the input line and the output lines and provided for a periodic accumulation of a given number of tablets, the accumulating device comprising a line for accumulating tablets and an assembly for regulating the flow of tablets, the assembly for regulating the flow of tablets comprising a member for retaining the tablets intended to allow the accumulation of the tablets in the accumulating line and a member for pushing the tablets intended to forcibly eject the accumulated tablets from the accumulating line;
  a conveying surface placed under the accumulating line and intended to accompany the displacement of the tablets of the input line in the direction of the output lines;
  a routing device intended to direct a flow of tablets coming from the input line in the direction of one or the other of the output lines.

Preferred but non-limiting aspects of this separating system, taken alone or in combination, are as follows:
  the pushing member is configured to push the tablets accumulated in the accumulating line at an ejection speed greater than a speed of conveying of the tablets through the accumulating line.
  the routing device comprises a supporting member on which the accumulating device is attached, the supporting member being mounted pivotably about an axis of pivot orthogonal to the conveying surface in such a way as to connect the accumulating line of the accumulating device to one or the other of the output lines as a function of the angular position of the supporting member.
  the system comprises two devices for accumulating tablets, respectively having an accumulating line placed upstream of one of the output lines, and the routing device comprises a routing member mounted pivotably about an axis of pivot orthogonal to the conveying surface in such a way as to connect the input line to one or the other of the accumulating lines of the accumulating devices as a function of the angular position of the routing member.
  the regulating assembly comprises a first elongated regulating part and a second elongated regulating part, the first and second elongated regulating parts being mounted movably in the accumulating device and configured to extend in the accumulating line and be translationally displaced along the accumulating line, the first and second elongated regulating parts being configured to alternately form the pushing member and the retaining member.
  the first elongated regulating part forms the pushing member when the second elongated regulating part forms the retaining member, and conversely the second elongated regulating part forms the pushing member when the first elongated regulating part forms the retaining member.

the accumulating device is configured for a synchronous displacement of the first and second elongated regulating parts.

the first and second elongated regulating parts are mounted on a belt arrangement extending along the accumulating line, each of the first and second elongated regulating parts extending perpendicular to a belt of the belt arrangement.

the belt of the belt arrangement extends between an input of the accumulating line and an output of the accumulating line, the first and second elongated regulating parts being arranged on the belt equidistantly such that when one of the first and second elongated regulating parts extends in the accumulating line at the level of the input of the accumulating line then the other of the first and second elongated regulating parts extends outside the accumulating line at the level of the output of the accumulating line, and when one of the first and second elongated regulating parts extends in the accumulating line at the level of the output of the accumulating line then the other of the first and second elongated regulating parts extends outside the accumulating line at the level of the input of the accumulating line.

the tablet retaining member comprises a retaining part positioned at the level of the end of the accumulating line on the side of the output lines and mounted movably with respect to the accumulating line such as to travel between a retracted position in which the accumulating line is left free and an extended position in which the retaining part then obstructs the accumulating line in order to retain the tablets in the accumulating line;

the pushing member comprises a pushing part mounted translatably along a direction parallel to the accumulating line and is furthermore movable with respect to the accumulating line such as to be displaced between a retracted position in which the accumulating line is left free and an extended position in which it comprises a pushing part translatably mounted along a direction parallel to the accumulating line and is furthermore movable with respect to the accumulating line such as to be displaced between a retracted position in which the accumulating line is left free and an extended position in which the pushing part extends in the accumulating line, a translation of the pushing part in the extended position making it possible to push the accumulating tablets through the accumulating line in the direction of one of the output lines.

the system comprises a blocking member arranged between the input line and the accumulating device in order to block the tablets in the input line and stop the flow of tablets entering into the accumulating device.

the blocking member comprises a compacting part mounted movably between a withdrawn position leaving the input line and an extended position in which the compacting part then blocks a tablet in the input line.

the conveying surface comprises a conveyor belt driven by a motor at a conveying speed.

the conveying speed is equal to a speed of inputting of the tablets into the accumulating line.

the conveying surface comprises a plurality of adjacent rollers mounted freely in rotation over which the tablets are intended to slide, the conveying surface being preferably inclined to favor the displacement of the tablets by the use of gravity.

the input line is inclined to favor the displacement of the tablets by the use of gravity.

the accumulating device is mounted to be withdrawable from the conveying surface in order to allow access to the conveying surface.

Here and in the remainder of the text, the term "at the level of" is understood to mean "on the side of" or "near to".

Provision is also made for an assembly for separating tablets comprising several systems for separating tablets as shown here. The systems for separating tablets are preferably in series and/or in parallel and are interconnected by conveying devices.

Finally, provision is made for a method for separating a flow of tablets which have been compacted by a compacting device, comprising the following steps:

A. recovering in an input line a flow of tablets at the output of a compacting device;

B. accumulating, in an accumulating line, tablets coming from the input line;

C. once a given number of tablets has been accumulated in the accumulating line:
   C1. blocking the tablets in the input line to stop the flow of tablets entering the accumulating line;
   C2. starting a forced ejection of the accumulated tablets of the accumulating line in the direction of a first output line;

D. once the forced ejection of the tablets of step C2 has begun, unblocking the tablets accumulated in the input line so that they then accumulate in the accumulating line;

E. once a given number of tablets has been accumulated in the accumulating line:
   E1. blocking the tablets in the input line in order to stop the flow of tablets entering the accumulating line;
   E2. starting a forced ejection of the accumulated tablets of the accumulating line in the direction of a second output line;

F. once the forced ejection of the tablets in step AE2 has started, unblocking the tablets accumulated in the input line so that they then accumulate in the accumulating line and start steps C to F again.

Preferred but non-limiting aspects of this separating method, taken alone or in combination, are as follows:

the forced ejection of step C2 and E2 comprises the pushing of the tablets accumulated in the ejection line at an ejection speed greater than a speed of conveying of the tablets through the accumulating line.

the accumulating line can be displaced to be brought face-to-face with the first output line or face-to-face with the second output line, and:
   before starting step C, the accumulating line is displaced to bring it face-to-face with the first output line;
   before starting step E, the accumulating line is displaced to bring it face-to-face with the second output line.

provision is made for a first line facing the first output line and provision is made for a second accumulating line facing the output line, a routing member for connecting the input line to one or the other of the first and second accumulating line, and:
   before starting step B, the routing member is displaced so that the input line is connected to the first accumulating line;

before starting step D, the routing member is displaced so that the input line is connected to the second accumulating line;

before starting step F, the routing member is displaced so that the input line is connected to the first accumulating line.

BRIEF DESCRIPTION OF THE FIGURES

Other features and advantages of the invention will become apparent from the following description, which is purely illustrative and non-limiting and must be read with reference to the appended drawings, wherein.

Among the different illustrated embodiments, identical elements bear the same reference numbers.

DETAILED DESCRIPTION OF THE INVENTION

To reduce the speed of the flow of compacted tablets, provision is therefore made for using a system for separating the flow of tablets which have been compacted by a compacting system such as a rotary press.

The separating system for which provision is made is particularly advantageous in that it makes it possible to separate the compacted tablets while avoiding the backing-up of compacted tablets in the compacting device, which can happen if the flow of compacted tablets at the output of the compacting device is for example stopped for too long a time.

The separating system for which provision is made relies on a principle, firstly of accumulation of compacted tablets on the one hand, then secondly the forced ejection of these accumulated tablets. The forced ejection time is preferably used to route the compacted tablets toward one out of several outputs of the separating system.

Figure 1:
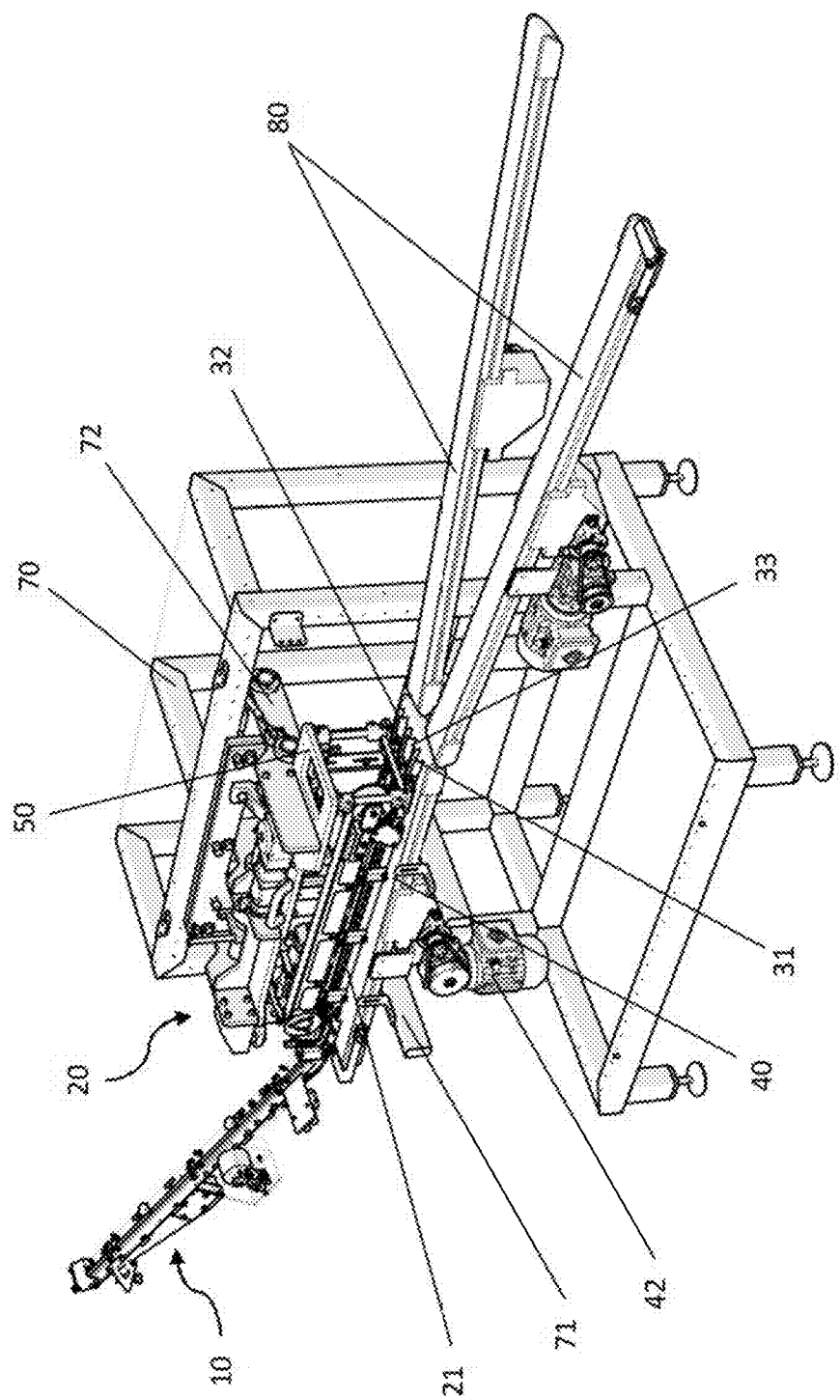
FIG. 1 is a perspective view of a separating system according to a first embodiment.
Figure 2:
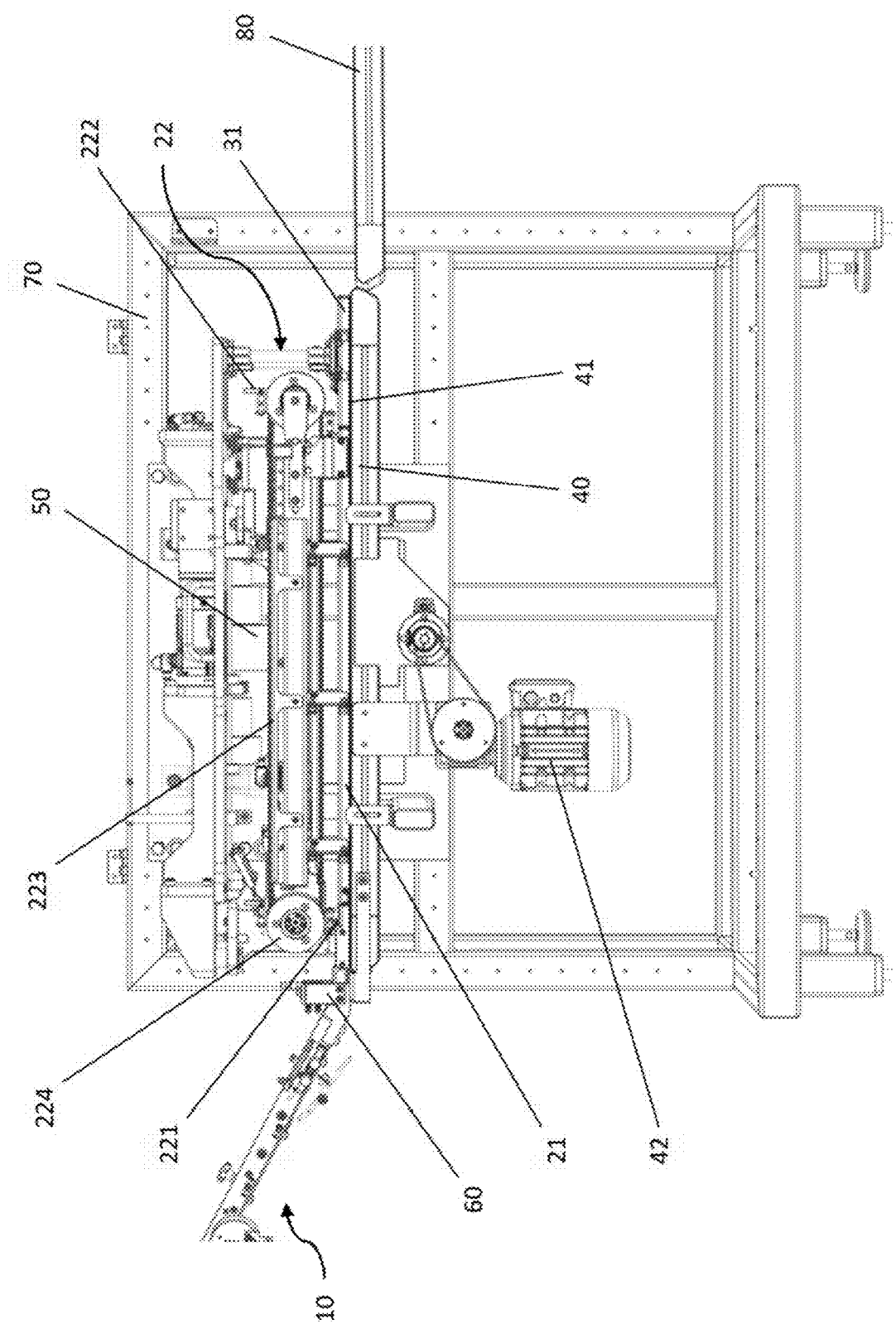
FIG. 2 is a side view of the separating system of FIG. 1.

FIGS. 1 and 2 illustrate an example of a proposed separating system.

The separating system first comprises an input line 10 which is configured to recover a flow of tablets at the output of a compacting device (not shown).

The tablets which have been compacted in the compacting device therefore enter the input line 10 at the production rate of the compacting device, for example at the rate of 1500 tablets per minute, i.e. 25 tablets per second.

The input line 10 is preferably inclined with respect to the surface on which the separating system is arranged, such that gravity participates in the displacement of the tablets compacted in the input line 10.

The input line 10 can be designed as a track having a sliding surface over which the compacted tablets slide. Such a sliding surface can be a flat sliding surface or be formed of a plurality of adjacent rollers mounted in free rotation on which the compacted tablets are intended to slide.

According to another example provision could be made for the input line to comprise a motor-driven conveying surface intended to accompany the displacement of the compacted tablets.

The compacted tablets therefore travel in the input line 10 at a certain speed which corresponds to the output speed of the compacted tablets of the compacting device combined with the effects due to the configuration of the input line as such, for example, gravity, which then adds a specific speed component.

The separating system further comprises several output lines (31; 32; 33) which are configured to eject tablets from the separating system.

Provision is made for at least two output lines (31; 32; 33) to effectively separate the flow of compacted tablets, but it can be envisioned that there are more than two output lines (31; 32; 33).

In the example illustrated in FIG. 1, one can for example see three output lines (31; 32; 33), two of the three output lines (31; 32) being provided for the effective separation of the flow, i.e. the flow of compacted tablets continues at the output of these two output lines (31; 32), while a third output line 33 is provided for a possible ejection of tablets from the separating system in order to remove them from the flow of compacted tablets.

The output lines (31; 32; 33) are preferably arranged substantially parallel to one another, which makes it possible to reduce the bulk of the separating system.

The separating system moreover comprises a tablet accumulating device 20 which is positioned between the input line 10 and the output lines (31; 32; 33). As will be seen, the accumulating device 20 is provided for a periodic accumulation of a given number of tablets. This means that the accumulating device 20 is configured to accumulate and therefore store compacted tablets coming from the input line 10 until a given number of tablets is reached, for example 24 tablets, before releasing them in the direction of one of the output lines (31; 32; 33).

For this purpose, the accumulating device 20 comprises a tablet accumulating line 21 and an assembly 22 for regulating the flow of tablets.

The regulating assembly 22 is intended to allow the accumulation in the accumulating line 21 of compacted tablets coming from the input line 10. In this regard, the regulating assembly 22 comprises a retaining member, such a retaining member being configured to stop the flow of tablets through the accumulating line 21, for example by obstructing the accumulating line 21.

The regulating assembly 22 furthermore has the peculiarity of being able to forcibly eject the compacted tablets that have accumulated in the accumulating line 21, in the direction of one of the output lines (31; 32; 33). In this regard, the regulating assembly 22 for example comprises a tablet pushing member, such a pushing member being intended to force the displacement of the compacted tablets that have accumulated in the accumulating line toward one of the output lines (31; 32; 33). It is understood that the retaining member will have been disengaged before forcing the ejection of the tablets of the accumulating line 21.

The pushing member can for example extend through the accumulating line 21 and then become positioned against a compressed tablet in order to push this tablet and the queue of accumulated tablets in front of this tablet in the direction of displacement of the tablets, in the direction of one of the output lines (31; 32; 33).

Preferably, the pushing member is configured to push the accumulated tablets in the ejection line 21 at an ejection speed greater than the speed of conveying of the tablets through the accumulating line 21. It should be noted that the speed of conveying of the tablets through the accumulating line 21 preferably corresponds substantially to the speed of the tablets compacted in the input line 10.

Preferably, the ejection speed is at least 20% greater than the speed of conveying of the tablets through the accumulating line 21, still preferably at least 50% greater, and still preferably at least the double of the input speed of the tablets in the accumulating line 21. The forced ejection speed can for example be up to 5 times the speed of conveying of the tablets through the accumulating line 21.

For example, if tablets of a length in the order of 30 to 35 mm enter the accumulating line 10 at a speed of approximately 1 m/s corresponding to a production rate of the compacting device of approximately 1500 tablets per minute, the speed of ejection of the compacted tablets by the pushing member can be in the order of 1.2 m/s to 5 m/s.

The separating system for which provision is made further comprises a conveying surface 40 placed under the accumulating line 21 and intended to accompany the displacement of the tablets from the input line 10 toward the output lines (31; 32; 33). This conveying surface 40 particularly makes it possible to displace the compacted tablets through the accumulating line 21 for the purpose of an accumulation and/or for the purpose of ejection. In the case of ejection, the conveying surface 40 has an action combined with the pushing member to eject the tablets toward one of the output lines (31; 32; 33).

According to the exemplary embodiment illustrated in the figures, the conveying surface can comprise a conveyor belt 41 driven by a motor 42. This conveyor belt 41 is driven at a certain conveying speed.

Preferably, the conveying speed is equal to the speed of inputting of the tablets into the accumulating line 21, substantially equal to the speed of the compacted tablets in the input line 10.

According to another exemplary embodiment (not shown), the conveying surface 40 may comprise a plurality of adjacent rollers mounted freely in rotation over which the tablets are intended to slide.

The conveying surface 40 can furthermore be inclined to favor the displacement of the compacted tablets by use of gravity.

The separating system further comprises a routing device 50 to direct a flow of tablets coming from the input line 10 in the direction of one or the other of the output lines (31; 32; 33).

The routing device 50 can take different forms.

According to an exemplary embodiment as illustrated in FIGS. 1 to 4, the routing device 50 comprises a supporting member 51 on which is attached the accumulating device 20. Such a supporting member 51 has the peculiarity of being mounted pivotably about an axis of pivot 52 orthogonal to the conveying surface 40 in such a way as to connect the accumulating line 21 of the accumulating device 20 to one or the other of the output lines (31; 32; 33) as a function of the angular position of the supporting member 51.

Figure 4:
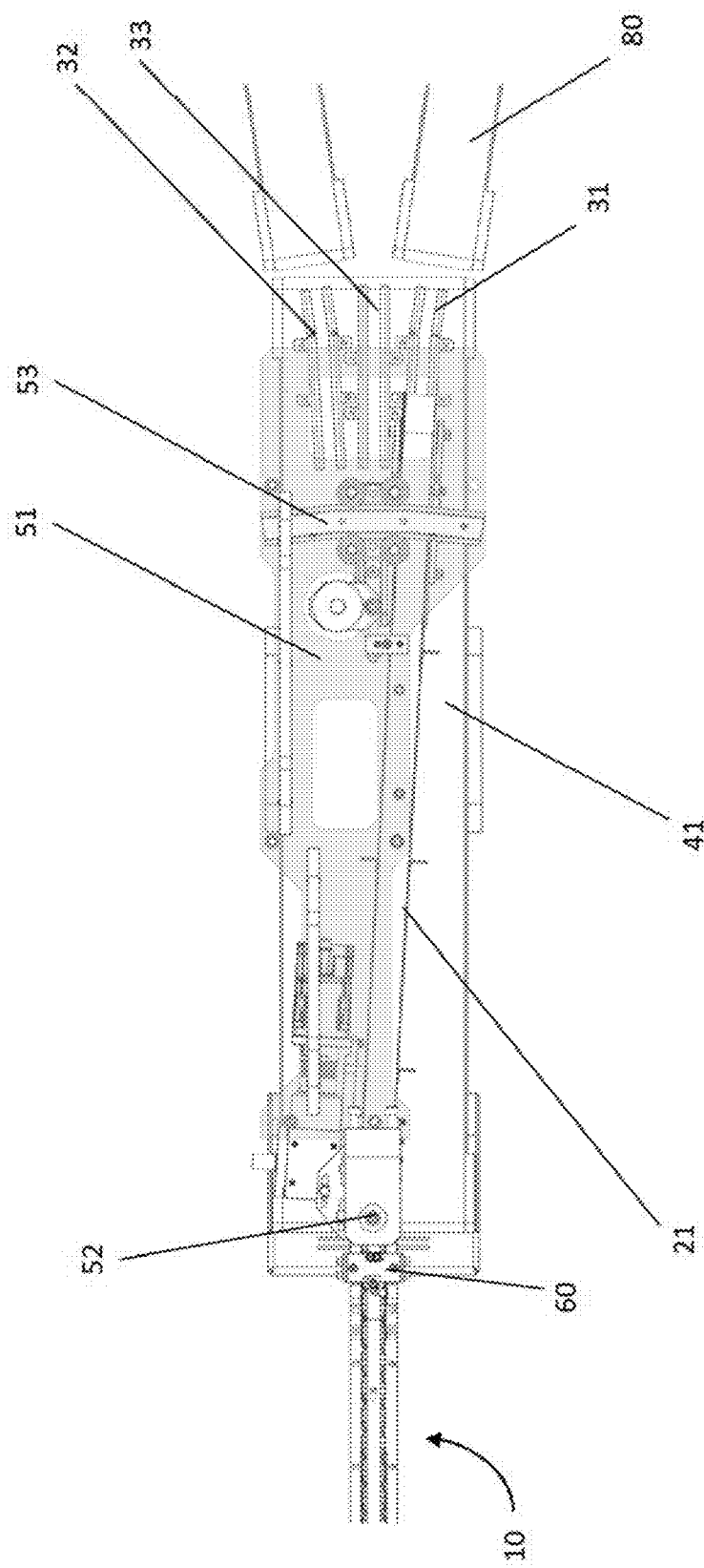
FIG. 4 is a top view of the accumulating device of the separating system of FIG. 1.

FIG. 4 is a top view illustrating the separating system comprising an example of such a supporting member 51 mounted pivotably. To facilitate the displacement of the supporting member 51, provision is preferably made for a guiding track 53, this guiding track 53 being for example curved along a radius of curvature corresponding to the desired rotation of the supporting member 51.

According to the configuration illustrated in FIG. 4, the accumulating line 21 is positioned facing a first input line 31 but can, owing to the supporting member 51 mounted pivotably about the axis of pivot 52, be positioned facing another output line, for example the second output line 32 or the third output line 33.

The use of a supporting member 51 mounted pivotably and intended to support the accumulating device 20 therefore makes it possible, with a single accumulating device 20 in the separating system, to separate the flow of compacted tablets coming from the input line 10 and to direct the tablets thus separated toward the different output lines (31; 32; 33) of the separating system.

In this case, the routing toward one or the other of the output lines (31; 32; 33) is therefore done after or during the accumulation by the accumulating device 20.

According to another embodiment, the separating system comprises several accumulating devices 20 respectively having an accumulating line 21 placed upstream of one of the output lines (31; 32; 33).

Figure 11:
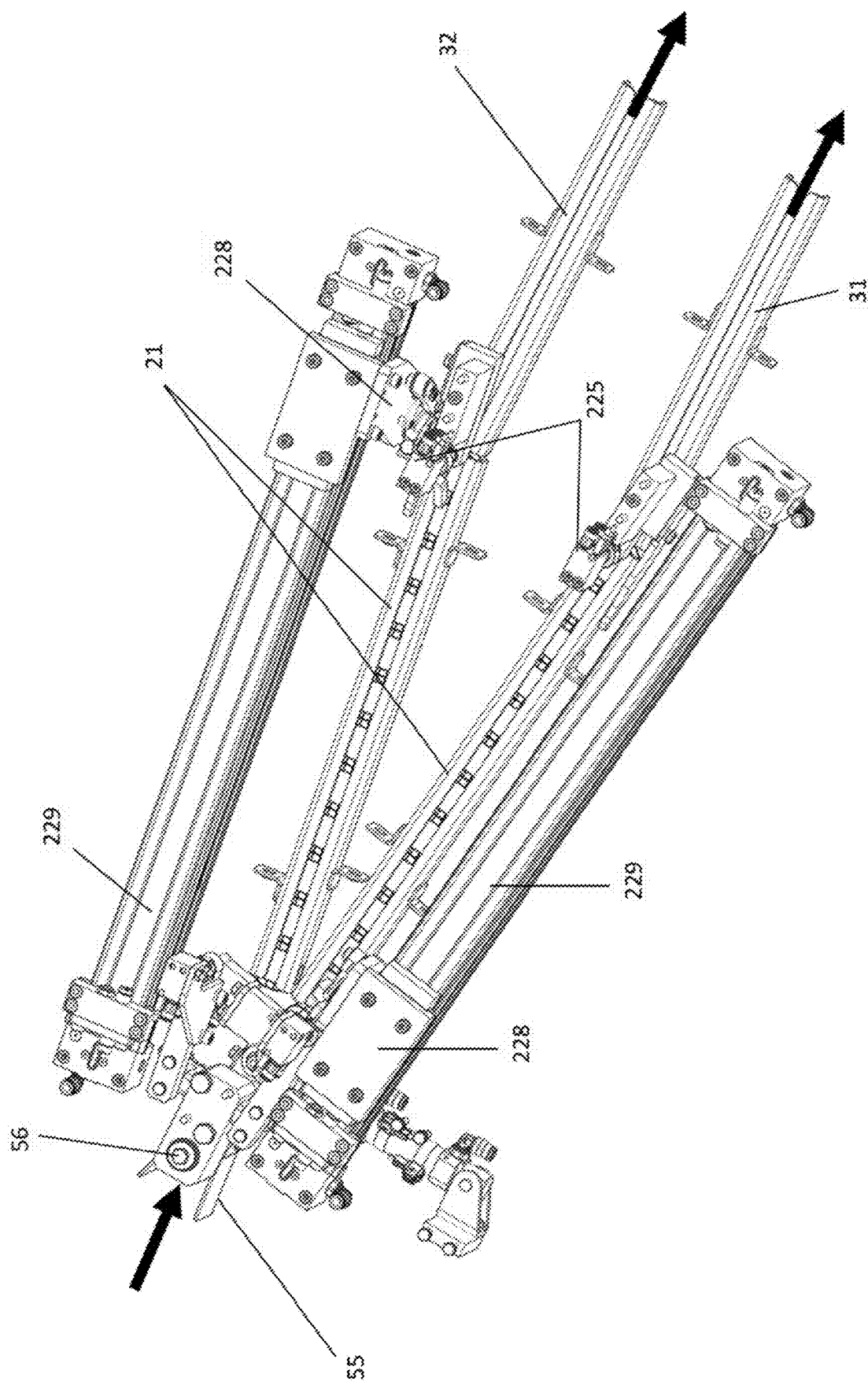
FIG. 11 is a perspective view of accumulating devices of a separating system according to a second embodiment.
Figure 12:
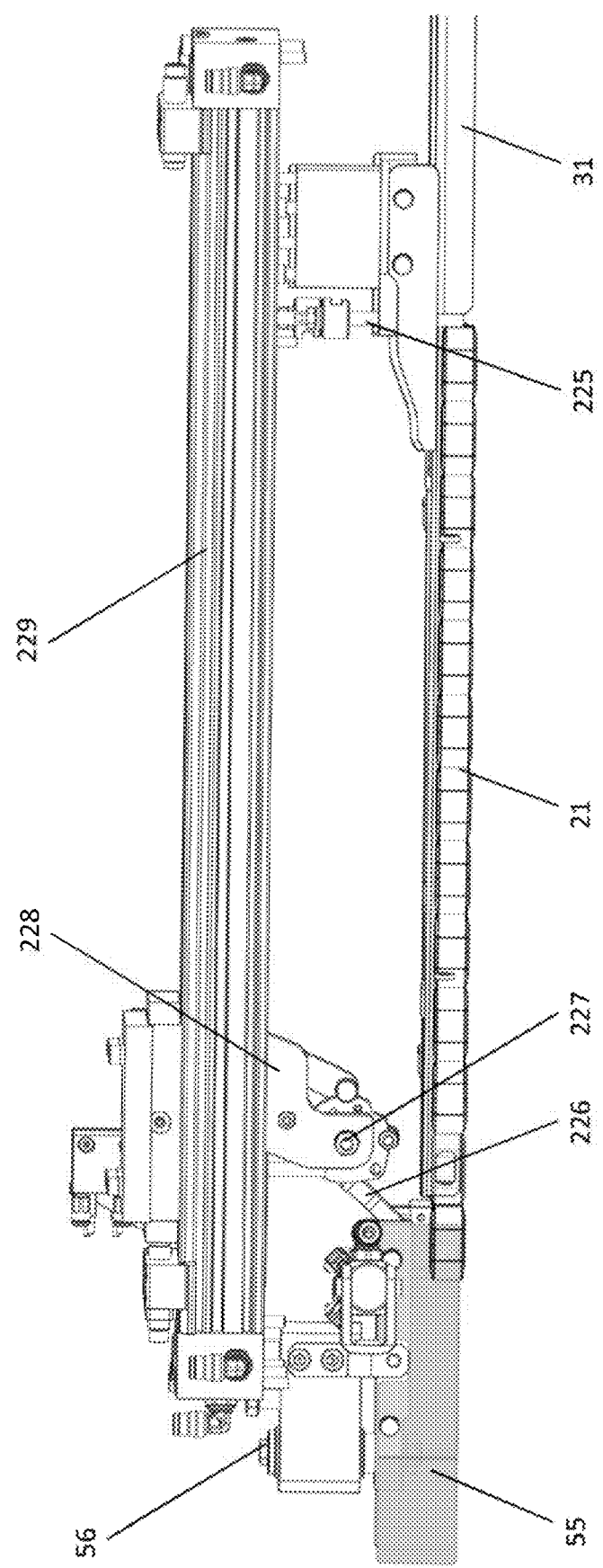
FIG. 12 is a side view of an accumulating device of the separating system according to the second embodiment.
Figure 13:
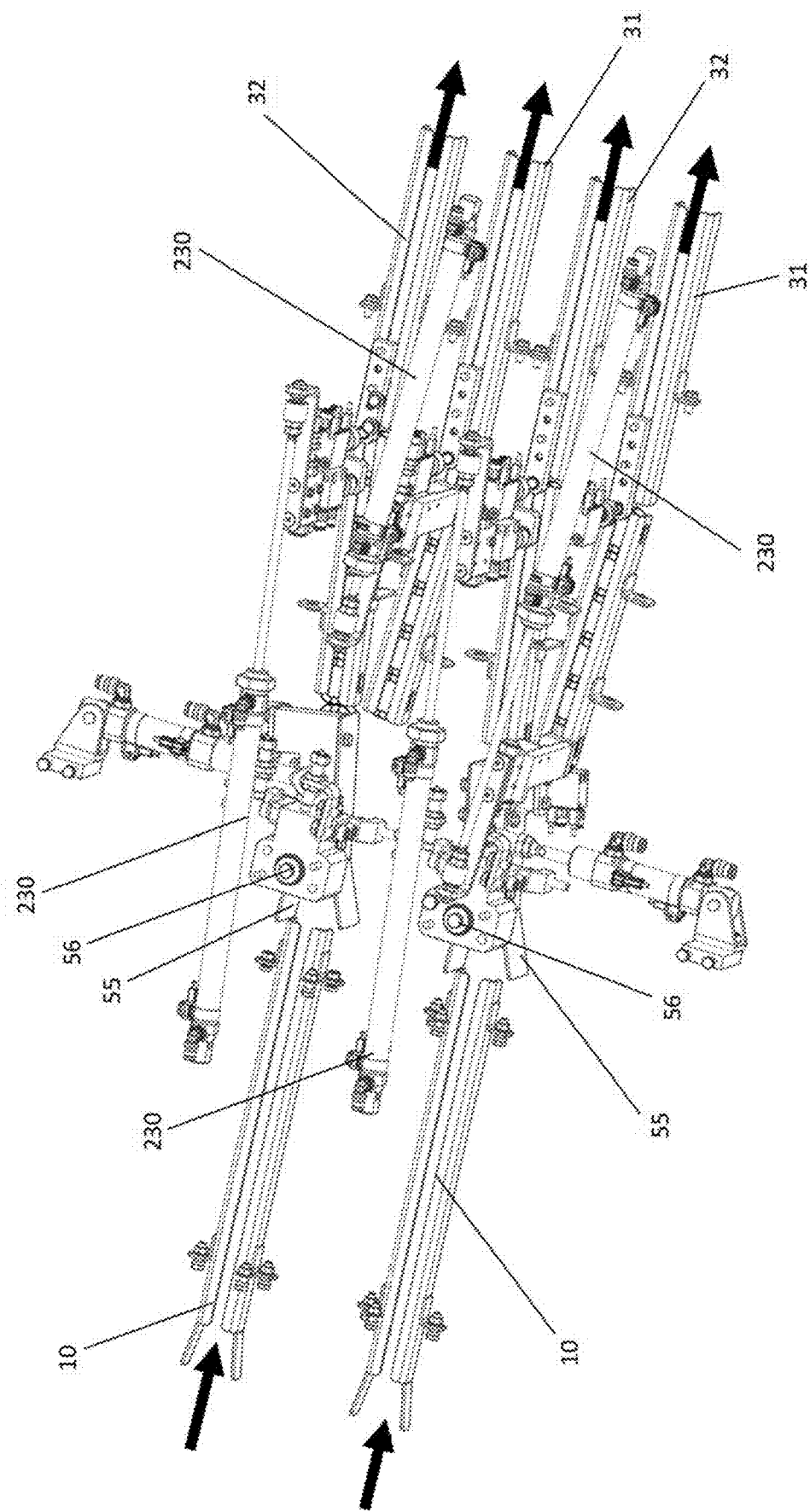
FIG. 13 is a perspective view of the accumulating devices of a separating system according to a third embodiment.

In this case, provision can be made in the separating system for as many accumulating devices 20 as there are output lines (31; 32; 33), each output line (31; 32; 33) being in the extension of an accumulating line 21 of one of the accumulating devices 20. FIGS. 11 to 13 illustrate exemplary embodiments according to such a configuration where the separating system comprises several accumulating devices, each supplying a specific output line.

In this case, the routing device 50 preferably comprises a routing member 55 mounted pivotably about an axis of pivot 56 orthogonal to the conveying surface 40, this routing member 55 making it possible to connect the input member 10 to one or the other of the accumulating lines 21 of the accumulating devices 20 as a function of the angular position of the routing member 55.

According to this configuration, the routing toward one or the other of the output lines (31; 32; 33) is done before the accumulation by the accumulating device 20.

According to a preferred embodiment, the separating system for which provision is made further comprises a blocking member 60 arranged between the input line 10 and the accumulating device 20 in order to block the tablets in the input line 10 and stop the flow of tablets entering the accumulating device 20.

For example, the blocking member 60 comprises a compacting part mounted movably between a withdrawn position leaving the input line 10 free and an extended position in which the compacting part then blocks a tablet in the input line. More precisely, the compacting part is intended to be added to a tablet present in the input line 10 in order to block it by compaction.

The compacting part can for example be mounted movably in translation along an axis substantially perpendicular to the input line 10.

The blocking member could take other forms. Provision could for example be made for a rod or plate mounted translatably in order to close the input line 10, the tablets abutting against this rod or plate.

The separating system further comprises preferably a frame 70 intended to support all or part of the component elements of the separating system. In particular, the frame 70 is intended to support the accumulating device 20, the conveying surface 40 and the routing device 50.

The output lines (31; 32; 33) are also preferably arranged on the frame 70.

The input line 10 could also be secured to the frame 70 but this is not necessary. This is because, since the input line 10 forms the join between the compacting device and the accumulating device 20, it can simply be positioned between the compacting device and the accumulating device 20 without necessarily being secured to these devices.

Preferably, the accumulating device 20 is mounted to be withdrawable from the conveying surface 40 to allow access to the conveying surface. This is particularly advantageous for facilitating the cleaning or maintenance of the separating system.

In this regard, provision can for example be made for the frame 70 to comprise a main body 71 on which the conveying surface 40 is arranged and a support 72 mounted pivotably with respect to the main body 71 along an axis parallel to the plane formed by the conveying surface, the support 72 being particularly intended to bear the different elements of the accumulating device 20.

The general structure of the accumulating devices 20 provided in the separating system has been described above. The regulating assembly 22 provided in the accumulating device 20 can however take different constructions.

According to an exemplary embodiment as illustrated in FIGS. 1 to 4, the regulating assembly 22 comprises a first elongated regulating part 221 and a second elongated regulating part 222, the first and second elongated regulating parts (221; 222) being mounted movably in the accumulating device 20 and configured to extend in the accumulating line 21. Furthermore, the first and second elongated regulating parts (221; 222) are intended to be displaced in translation along the accumulating line.

According to this exemplary embodiment, the first and second elongated regulating parts (221; 222) are configured to form, alternately, the pushing member and the retaining member of the regulating assembly 22.

Preferably, as can be seen from the description below concerning the operation of this exemplary embodiment of the separating system, the first elongated regulating part 221 forms the pushing member when the second elongated regulating part 222 forms the retaining member, and conversely the second elongated regulating part 222 forms the pushing member when the first elongated regulating part forms the retaining member 221.

Still preferably, the accumulating device 20 is configured for a synchronous displacement of the first and second elongated regulating parts (221; 222).

For this purpose, the first and second elongated regulating parts (221; 222) are for example mounted on a belt arrangement extending along the accumulating line 21, each of the first and second elongated regulating parts (221; 222) extending from a belt 223 of the belt arrangement, for example in a way that is substantially perpendicular to the belt 223 as illustrated in the figures. Such an arrangement is mechanically quite simple since the first and second elongated regulating parts (221; 222) are fixed with respect to the belt 223 which is the only part that is driven by a gear mechanism rotationally driven by a motor.

The belt 223 of the belt arrangement extends preferably between an input of the accumulating line 21 and an output of the accumulating line 21, which makes it possible to cover the whole accumulating line 21. Provision is for example made for two gear wheels 224 positioned respectively at the level of the input of the accumulating line 21 and at the level of the output of the accumulating line 21, these two gear wheels 224 driving the belt 223.

The first and second elongated regulating parts (221; 222) can for example be arranged on the belt 223 equidistantly, particularly with respect to the perimeter of the belt. Thus, when one of the first and second elongated regulating parts (221; 222) is positioned at a specific position on the displacement path of the belt 223, then the other of the first and second elongated regulating parts (221; 222) is in a position exactly opposite on the path of displacement of the belt 223.

Figure 8:
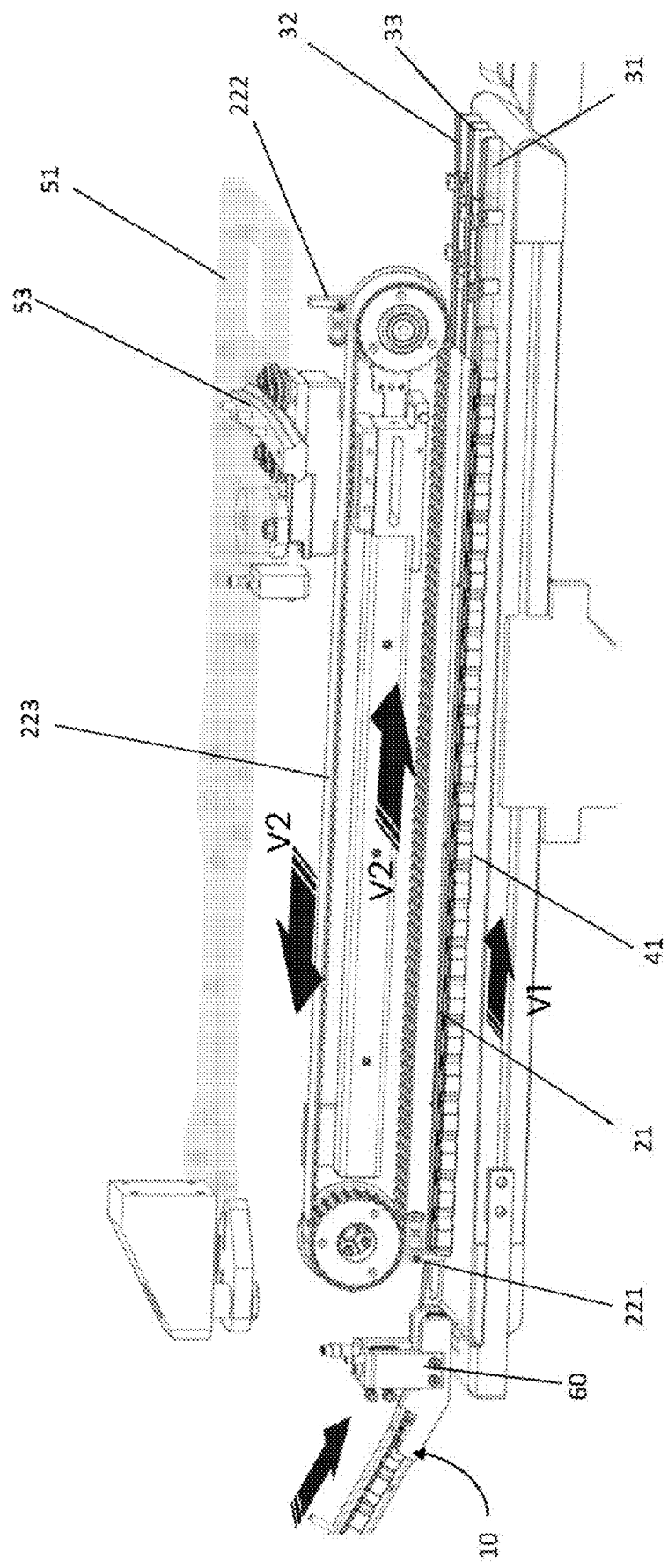

Thus, when one of the first and second elongated regulating parts (221; 222) extends in the accumulating line 21 at the level of the input of the accumulating line 21 then the other of the first and second elongated regulating parts (221; 222) extends outside the accumulating line 21 at the level of the output of the accumulating line 21. Such a configuration is illustrated in FIGS. 2 and 8 for example.

Figure 3:
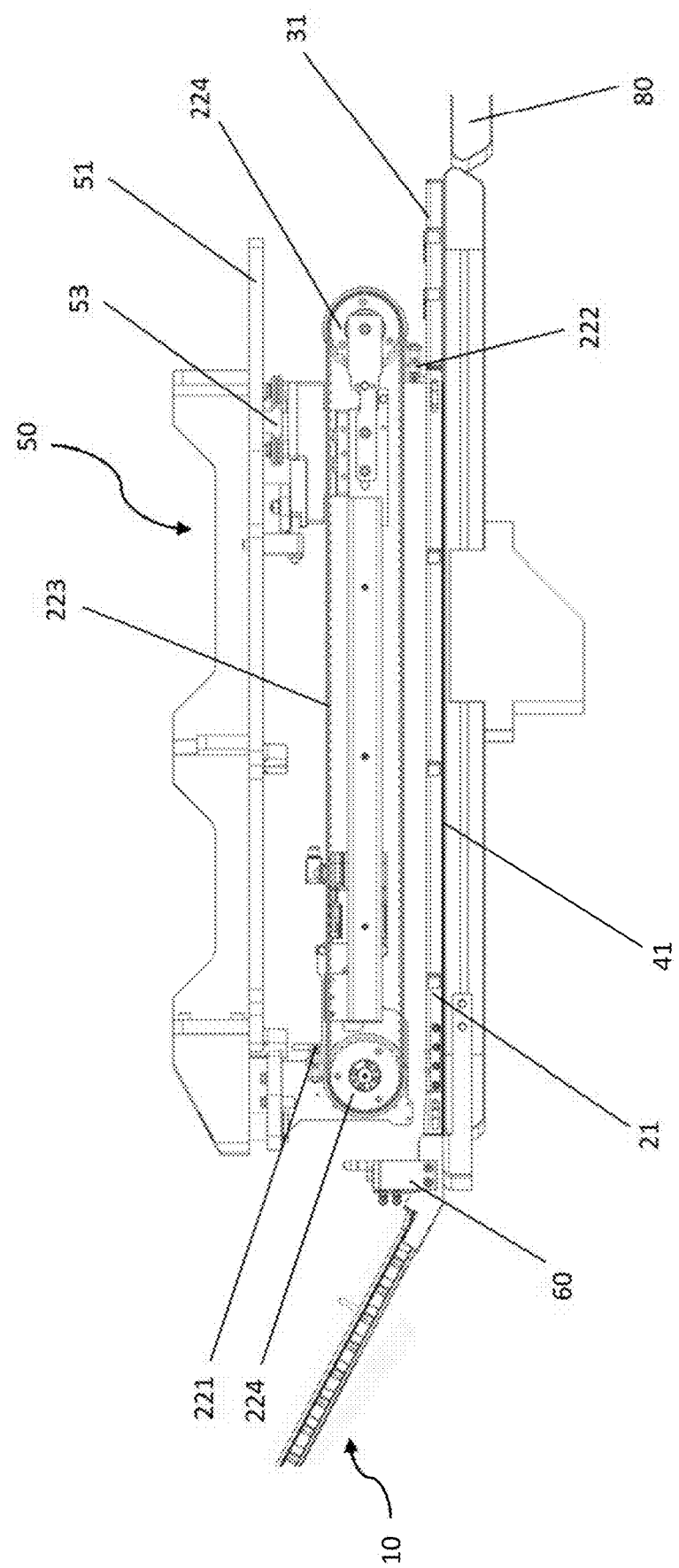
FIG. 3 is a side view of an accumulating device of the separating system of FIG. 1.
Figure 5:
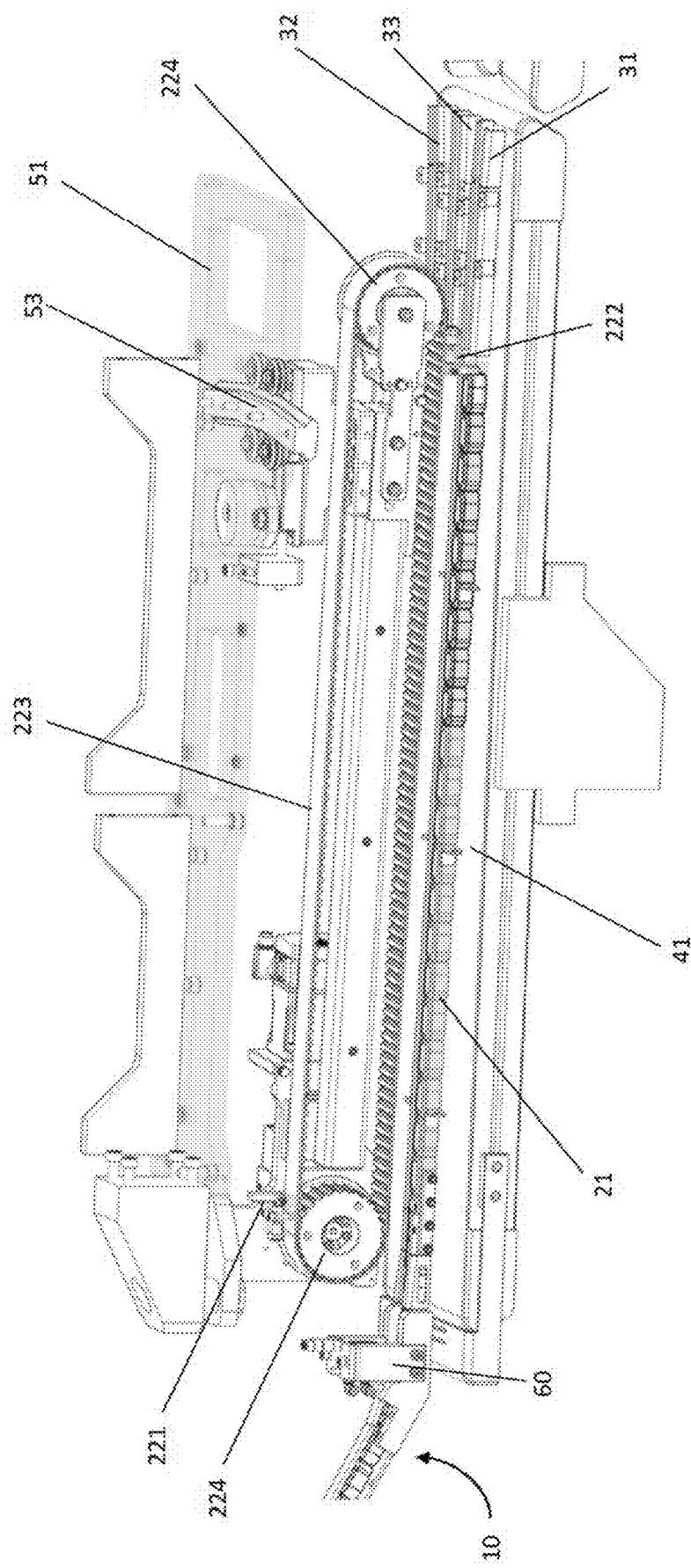
FIG. 5 is a perspective view of the accumulating device of the separating system of FIG. 1.
Figure 6:
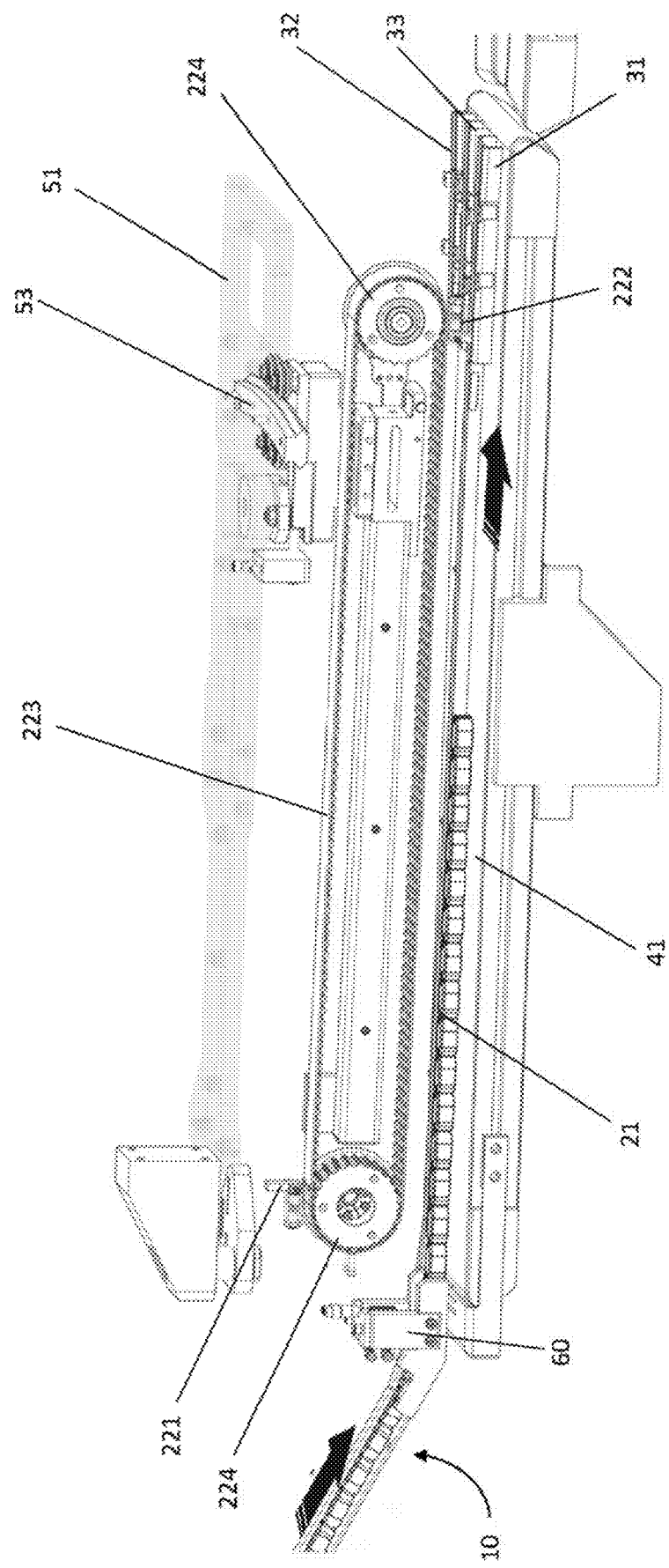
FIGS. 6 to 10 are illustrations of the separating method implemented by the separating system of FIG. 1.

Respectively, when one of the first and second elongated regulating parts (221; 222) extends in the accumulating line 21 at the level of the output of the accumulating line 21 then the other of the first and second elongated regulating parts (221; 222) extends outside the accumulating line 21 at the level of the input of the accumulating line 21. Such a configuration is illustrated in FIGS. 3, 5, and 6 for example.

According to another exemplary embodiment of the regulating assembly 22, as illustrated in FIGS. 11 and 12, the tablet retaining member comprises a retaining part 225 positioned at the level of the end of the accumulating line 21 on the side of the output lines (31; 32; 33).

Such a retaining part 225 is mounted movably with respect to the accumulating line 21 such as to travel between a retracted position in which the accumulating line 21 is left free and an extended position in which the retaining part 225 then obstructs the accumulating line 21 in order to retain the tablets present in the accumulating line 21.

For example, the retaining part 225 is mounted translatably along an axis of translation extending radially with respect to the accumulating line 21. The axis of translation of the retaining part 225 can for example be orthogonal to the plane of displacement formed by the accumulating line 21.

In the exemplary embodiment illustrated in FIGS. 11 and 12, the retaining part 225 is a rod mounted translatably along its own axis which is orthogonal to the accumulating line 21. When an accumulation in the accumulating line 21 is desired, the rod is extended to extend in the accumulating line 21 and it thus forms a stop for the tablets travelling through the accumulating line 21.

The pushing member, meanwhile, can comprise a pushing part 226 mounted translatably along a direction parallel to the accumulating line 21 and furthermore movably with respect to the accumulating line 21 such as to travel between a retracted position in which the accumulating line 21 is left free and an extended position in which the pushing part 226 extends in the accumulating line 21. A translation of the pushing part 226 into the extended part thus makes it possible to push the tablets accumulated in the accumulation line 21 in the direction of one of the output lines (31; 32; 33).

The pushing part 226 can for example be an elongated element mounted pivotably about an axis of rotation 227 on a movable part 228 of a cylinder 229. Such a cylinder 229 is intended to translate the movable part 228 along the longitudinal axis of the cylinder body 229, and consequently the pushing part 226.

As for the exemplary embodiment of the FIGS. 11 and 12, it is possible to use a rodless cylinder 229 which offers the advantage of having limited axial bulk. Specifically, the length of the cylinder is substantially the same as the track along which the movable element 228 must travel.

The exemplary embodiment of FIG. 13 repeats a similar arrangement to that of FIGS. 11 and 12, except for the cylinder which is this time a rodded cylinder 230. Such a rodded cylinder 230 has a greater axial bulk than a rodless cylinder but it has a smaller lateral bulk, which is advantageous if several accumulating devices 20 must be placed beside one another.

In the example illustrated in FIG. 13, two separating systems are arranged one beside the other, each separating system having two accumulating devices each having an accumulating line 21 connected to an output line (31; 32) of the separating system.

Figure 14:
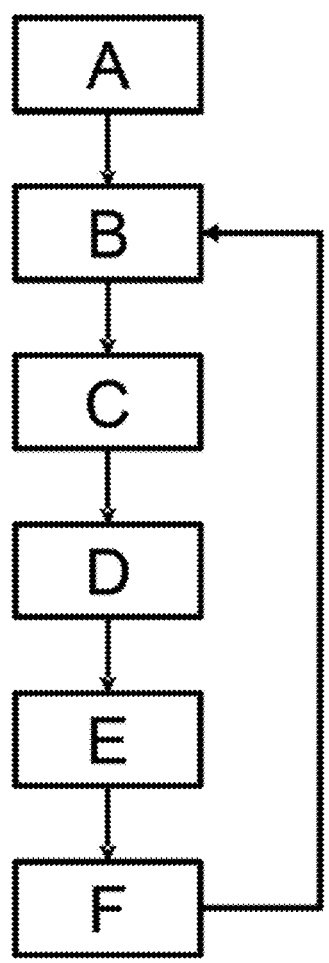
FIG. 14 is a diagram illustrating the steps of the proposed separating method.

There will now be a detailed description of the general principle of separation of a flow of tablets which have been compacted by a compacting device. The steps of such a process are schematized in FIG. 14. FIGS. 6 to 10 illustrate the proposed separation principle applied to the separating system illustrated in FIGS. 1 to 5. The proposed operation is however not limited to this separating system and could be applied with other configurations of the separating system, according to the embodiments of FIGS. 11, 12, and 13. The arrows used in the figures illustrate the displacements of the elements such as the tablets or the driven parts of the separating system such as the conveyor belt 41 or the belt 223.

The first step, denoted step A, consists in recovering in the input line 10 a flow of tablets at the output of a compacting device. For this purpose, the input line 10 is directly coupled to the output line of a compacting device.

As illustrated in FIG. 6, the compacted tablets are displaced inside the input line 10. They descend for example under gravity due to the inclination of the input line 10.

There is then a step B of accumulating of the tablets coming from the input line 10. To do this, the tablets coming from the input line 10 are transported through the accumulating line 21 of the accumulating device 20. This implies that the blocking member 60 at the output of the input line 10 is retracted to let the compacted tablets pass in the direction of the accumulating line 21.

Preferably, the conveyor belt 41 drives the tablets along the accumulating line 21 at a given speed, known as the conveying speed V1.

So that there actually is an accumulation of the tablets in the accumulating line 21, it is advisable for the retaining member to be in the extended position. According to the example illustrated in FIG. 6, the belt 223 is fixed and positioned such that the second elongated regulating part 222 extend in the accumulating line 21 in order to form a stop preventing the tablets from leaving the accumulating line 21.

The following step is step C which starts once a predetermined number of tablets has been accumulated in the accumulating line. For example, this number of accumulated tablets can be set to 24, which corresponds substantially to the number of tablets produced per second for a compacting device producing at a rate of 1500 tablets per minute.

It is then advisable in step C to first of all block the tablets in the input line 10 in order to stop the flow of tablets entering the accumulating line 21 (step C1). To do this, one for example operates the provided blocking member 60 to block a tablet at the output of the input line 10, just before it enters the accumulating device 20. This blocking will cause a temporary accumulation of tablets in the input line 10, but it is short enough to avoid the backing-up of the tablets in the compacting device.

Figure 7:
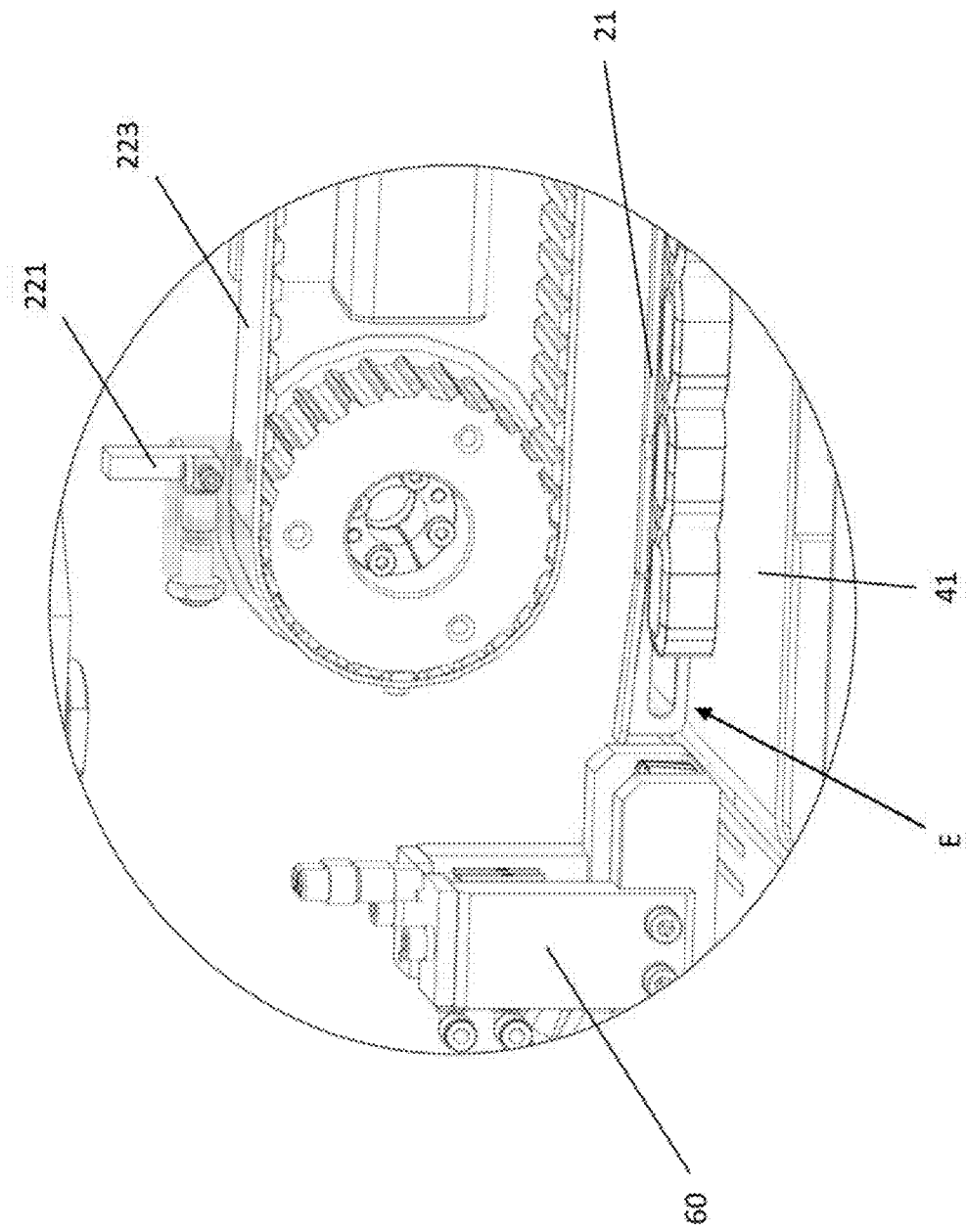

As illustrated in FIG. 7, this blocking of tablets at the level of the output of the input line makes it possible to free up a space E at the level of the input of the accumulating line 21 since the tablets are still in movement in the accumulating line 21, particularly owing to the driving of the conveyor belt 41.

One can then begin a forced ejection of the accumulated tablets from the accumulating line 21 in the direction of a first output line 31 (step C2). To do this, the belt 223 can be actuated so that it drives the first and second elongated regulating parts (221; 222).

As illustrated in FIG. 8, the displacement of the belt 223 will drive the second elongated regulating part 222 such as to free up the accumulating line 21 while the first elongated regulating part 221 will enter the accumulating line 21 such as to then push the queue of tablets which was blocked in the accumulating line 21. The fact that a space E has been created at the time of blocking of the tablets in the input line 10 allows the first elongated regulating part 221 to enter the accumulating line 21 without then striking the tablets and thus to avoid damaging them.

As mentioned above, the belt 223 preferably rotates at a belt speed V2 greater than the conveying speed V1 of the conveyor belt 41, such as to create a forced ejection of the tablets from the ejection line 21 by the first elongated regulating part 221.

Once the forced ejection of the tablets of step C2 has begun, it is possible to unblock the tablets accumulated in the input line 10 so that they then accumulate in the accumulating line 21 (step D). For this purpose, the blocking member 60 can be disabled to release the tablets retained in the input line 10.

Figure 9:
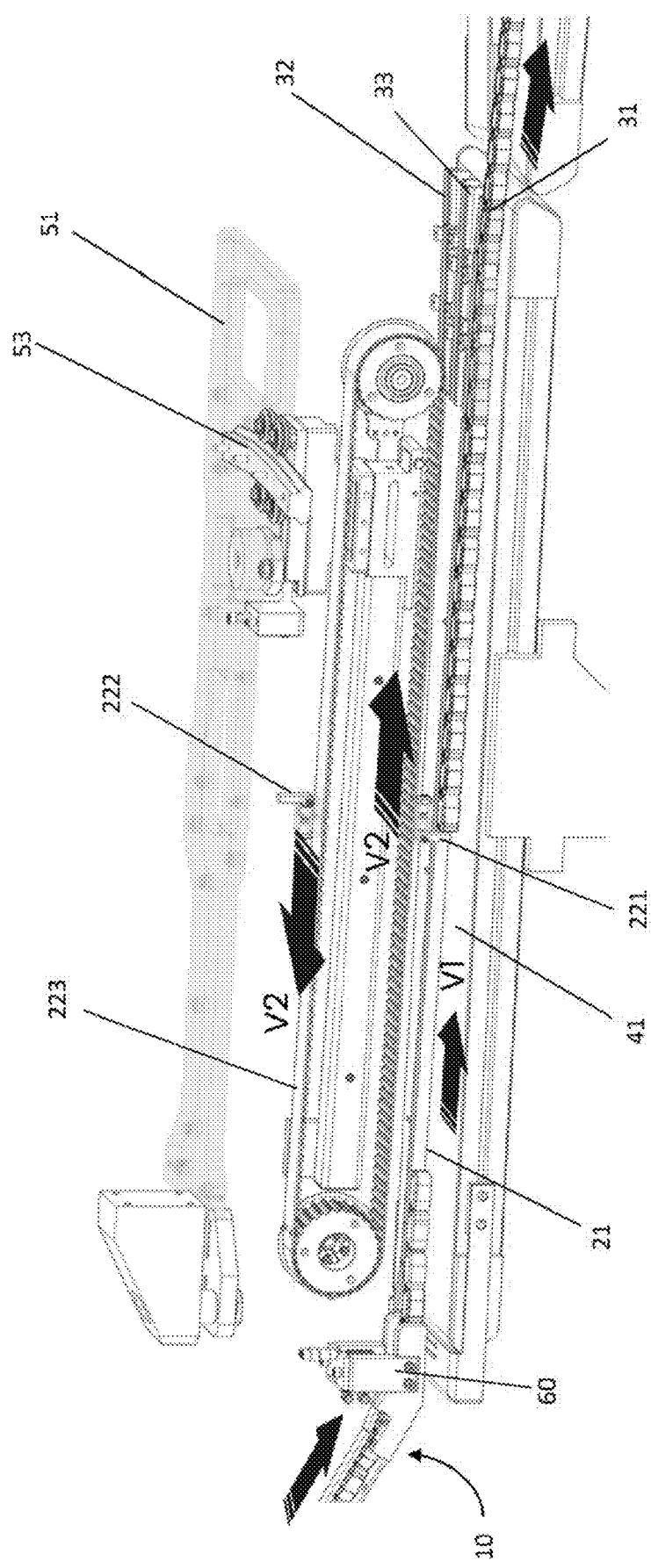

As illustrated in FIG. 9, the tablets are therefore ejected toward an output line, particularly owing to the first elongated regulating part 221 which serves as a pushing member, at the forced ejection speed V2. At the same time, the tablets coming from the input line 10 enter the accumulating line 21 by being, for example, transported in the conveyor belt 41, at the conveying speed V1.

Figure 10:
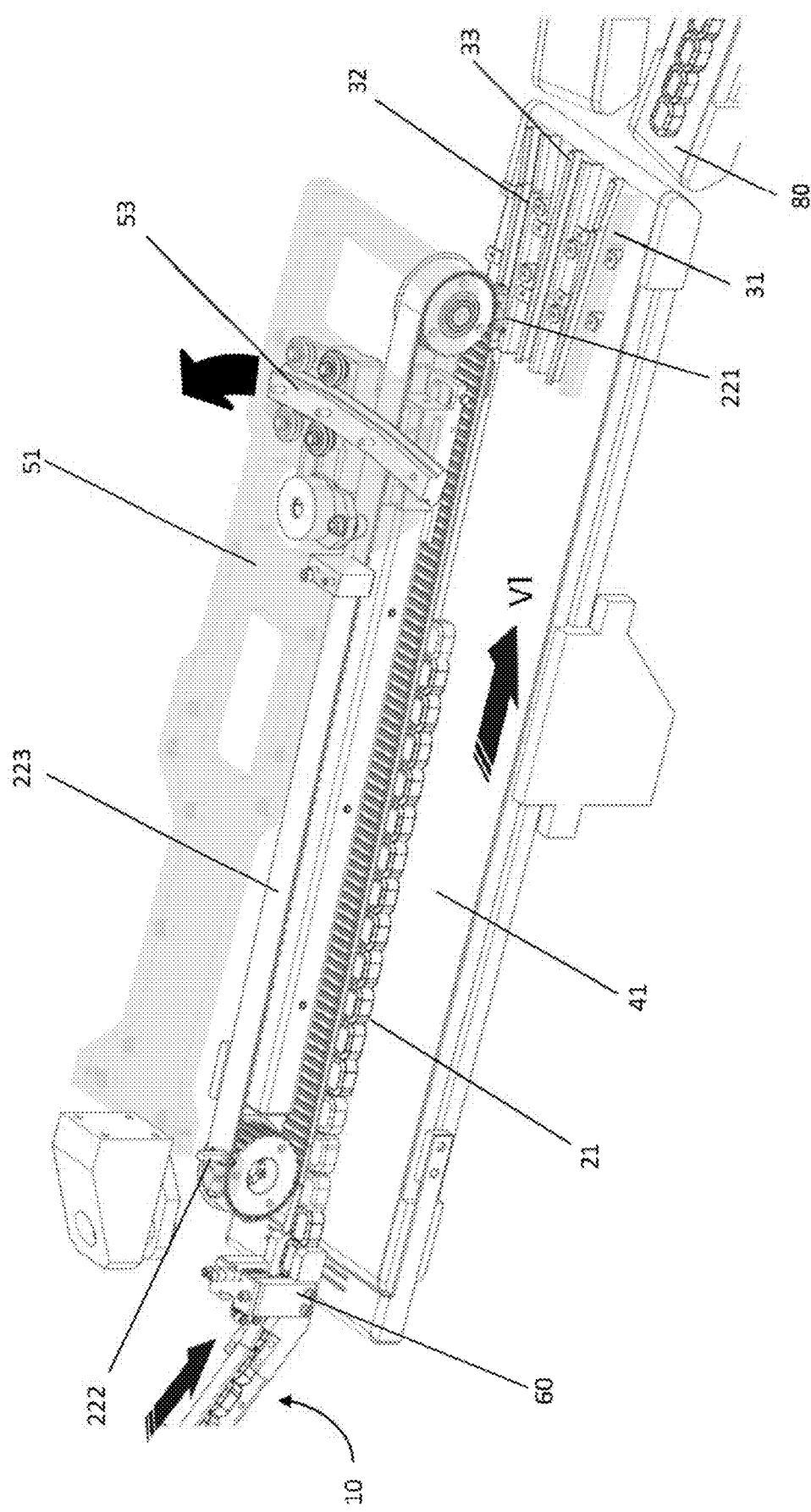

With a separating system having a single accumulating device 20 such as that of FIGS. 1 to 5, one can displace the accumulating device 20 before starting the subsequent step, particularly in order to displace the accumulating line 21 and position it facing another output line of the separating system. The accumulating device 20 can for example be moved while the tablets are in the process of accumulating in the accumulating line. Such a repositioning of the accumulating device is illustrated in FIG. 10.

With a separating system having several accumulating devices 20 such as those of FIGS. 11 to 13, the routing member 55 can be moved so that the input line 10 is connected to one or the other of the accumulating lines 21 of the accumulating devices 20 of the separating system. This actuation of the routing member 55 is done before starting an accumulation of tablets, i.e. before disengaging the blocking member of the input line 10.

The cycle of steps C and D which made it possible to direct compacted tablets into a first output line 31 is repeated in order to accumulate then direct compacted tablets into a second output line 32.

With the configuration of the separating system of FIGS. 1 to 5, the first elongated regulating part 221 which has pushed the tablets outside the accumulation line 21 is then positioned at the output of the ejection line 21 and is maintained in the extended position in the accumulation line 21 in order to serve as a retaining member. The belt 223 is therefore immobile and maintainer fixed in the position allowing an accumulation of the tablets in the accumulation line 21. As can be seen in FIG. 10, the second elongated regulating part 222 has been moved during the forced ejection of the tablets and it is positioned, at the level of the input of the accumulating line 21, and will subsequently then serve as a pushing member for the rest of the separation cycle.

Such a configuration is particularly advantageous since it makes it possible to reduce, or even eliminate, any idle time in the separating method. Specifically, as the first and second elongated regulating parts (221; 222) are configured to alternately form the pushing member and the retaining member, there is no time lost resetting the system, in particular so that the pushing member travels from the output of the accumulating line 21 to the input of the accumulating line 21.

These successive cycles are then repeated in a loop to separate the compacted tablets coming from the compacting device and direct them successively toward a first output line then toward a second output line, then again toward the first output line then toward the second output line, and so on.

The device and method for separating compacted tablets have been described with reference to a single separating system. It should however be noted that according to the separation requirements in view of the post-processing steps, it is possible to use several systems for separating tablets positioned in series and/or in parallel and connected to one another by conveying devices 80.

In particular, provision can be made for a separating system at the output of a compacting device, this separating system having two output lines themselves coupled to input lines of two other separating systems, each also having two output lines which can themselves be coupled to input lines of four other separating systems. With such an arrangement, one can in particular divide the flow of tablets into four, and divide the displacement speed by that amount.

The conveying devices provided at the output of the separating systems make it possible to adjust the displacement speed of the tablets more finely, by making decelerations or accelerations, in particular just before the post-processing device so that the displacement speed of the tablets is exactly equivalent to the speed required in the post-processing device.

The invention claimed is:

1. A system for separating a flow of tablets compacted by a compacting device, the separating system comprising:
   an input line configured to recover a flow of tablets at the output of the compacting device;
   two output lines to eject tablets from the separating system;
   a device for accumulating tablets positioned between the input line and the output lines and provided for a periodic accumulation of a given number of tablets, the accumulating device comprising a line for accumulating tablets and an assembly for regulating flow of tablets, the assembly for regulating flow of tablets comprising a member for retaining the tablets to allow accumulation of the tablets in the accumulating line, and a member for pushing the tablets to forcibly eject the accumulated tablets from the accumulating line;
   a conveying surface placed under the accumulating line and to accompany displacement of the tablets of the input line in a direction of the output lines;
   a routing device to direct a flow of tablets coming from the input line in the direction of one or the other of the output lines;
   wherein the pushing member is configured to push the tablets accumulated in the accumulating line at an ejection speed greater than a speed of conveying of the tablets through the accumulating line.

2. The system of claim 1, wherein the routing device comprises a supporting member on which the accumulating device is attached, the supporting member being mounted pivotably about an axis of pivot orthogonal to the conveying surface to connect the accumulating line of the accumulating device to one or the other of the output lines as a function of an angular position of the supporting member.

3. The system of claim 1, comprising two devices for accumulating tablets, respectively having an accumulating line placed upstream of one of the output lines, and the routing device comprises a routing member mounted pivotably about an axis of pivot orthogonal to the conveying surface to connect the input line to one or the other of the accumulating lines of the accumulating devices as a function of an angular position of the routing member.

4. The system of claim 1, wherein the regulating assembly comprises a first elongated regulating part and a second elongated regulating part, the first and second elongated regulating parts being mounted movably in the accumulating device and to extend in the accumulating line and be translationally displaced along the accumulating line, the first and second elongated regulating parts being configured to alternately form the pushing member and the retaining member.

5. The system of claim 4, wherein the first elongated regulating part forms the pushing member when the second elongated regulating part forms the retaining member, and wherein the second elongated regulating part forms the pushing member when the first elongated regulating part forms the retaining member.

6. The system of claim 4, wherein the accumulating device is configured for a synchronous displacement of the first and second elongated regulating parts.

7. The system of claim 4, wherein the first and second elongated regulating parts are mounted on a belt arrangement extending along the accumulating line, each of the first and second elongated regulating parts extending perpendicular to a belt of the belt arrangement.

8. The system of claim 7, wherein the belt of the belt arrangement extends between an input of the accumulating line and an output of the accumulating line, the first and second elongated regulating parts being arranged on the belt equidistantly such that when one of the first and second elongated regulating parts extends in the accumulating line at a level of the input of the accumulating line, then the other of the first and second elongated regulating parts extends outside the accumulating line at a level of the output of the accumulating line, and when one of the first and second elongated regulating parts extends in the accumulating line at the level of the output of the accumulating line, then the other of the first and second elongated regulating parts extends outside the accumulating line at the level of the input of the accumulating line.

9. The system of claim 1, wherein:
   the tablet retaining member comprises a retaining part positioned at a level of an end of the accumulating line on a side of the output lines and mounted movably with respect to the accumulating line such as to travel between a retracted position in which the accumulating line is left free and an extended position in which the retaining part obstructs the accumulating line to retain the tablets in the accumulating line; and
   the pushing member comprises a pushing part mounted translatably along a direction parallel to the accumulating line, and is movable with respect to the accumulating line, and is movable with respect to the accumulating line such as to be displaced between a retracted position in which the accumulating line is left free, and an extended position in which the pushing part extends in the accumulating line, a translation of the pushing part in the extended position enables the pushing part to push the accumulating tablets though the accumulating line in the direction of one of the output lines.

10. The system of claim 1, comprising a blocking member arranged between the input line and the accumulating device to block the tablets in the input line and stop the flow of tablets entering into the accumulating device.

11. The system of claim 10, wherein the blocking member comprises a compacting part mounted movably between a withdrawn position leaving the input line free, and an extended position in which the compacting part blocks a tablet in the input line.

12. The system of claim 1, wherein the conveying surface comprises a conveyor belt driven by a motor at a conveying speed, or the conveying surface comprises a plurality of adjacent rollers mounted freely in rotation over which the tablets are slidable.

13. The system of claim 12, wherein the conveying surface is inclined to favor displacement of the tablets by gravity.

14. An assembly for separating tablets compacted by a compacting device comprising a plurality of separating systems for separating tablets and being positioned in series and/or in parallel and being interconnected by conveying devices; each separating system comprising:
   an input line configured to recover a flow of tablets at an output of the compacting device;
   two output lines to eject tablets from the separating system;
   a device for accumulating tablets positioned between the input line and the output lines and configured for a periodic accumulation of a given number of tablets, the accumulating device comprising a line for accumulating tablets and an assembly for regulating flow of tablets, the assembly for regulating flow of tablets comprising a member for retaining the tablets to allow accumulation of the tablets in the accumulating line, and a member for pushing the tablets to forcibly eject the accumulated tablets from the accumulating line;
   a conveying surface placed under the accumulating line and to accompany displacement of the tablets of the input line in a direction of the output lines;
   a routing device to direct a flow of tablets coming from the input line in the direction of one or the other of the output lines.

15. A method for separating a flow of tablets which have been compacted by a compacting device, the method comprising the following steps:
   A. recovering in an input line a flow of tablets at an output of a compacting device;
   B. accumulating, in an accumulating line, tablets coming from the input line;
   C. once a given number of tablets has been accumulated in the accumulating line:
      C1. blocking the tablets in the input line to stop the flow of tablets entering the accumulating line;
      C2. starting a forced ejection of the accumulated tablets of the accumulating line in a direction of a first output line at an ejection speed greater than a speed of conveying of the tablets through the accumulating line;
   D. once the forced ejection of the tablets of step C2 has begun, unblocking the tablets accumulated in the input line so that the tablets accumulate in the accumulating line;
   E. once a given number of tablets has been accumulated in the accumulating line:
      E1. blocking the tablets in the input line in order to stop the flow of tablets entering the accumulating line;
      E2. starting a forced ejection of the accumulated tablets of the accumulating line in a direction of a second output line;
   F. once the forced ejection of the tablets in step E2 has started, unblocking the tablets accumulated in the input line so that the tablets accumulate in the accumulating line, and starting steps C to F again.

16. The method of claim 14, wherein the forced ejection steps C2 and E2 comprise pushing the tablets accumulated in the ejection line at an ejection speed greater than a speed of conveying of the tablets through the accumulating line.

* * * * *